Patented July 24, 1951

2,561,948

UNITED STATES PATENT OFFICE 2,561,948

AMINOALKYLATED DIAMINO DIPHENYL SULFONES

Albert L. Rawlins, Grosse Pointe Woods, Mich., assignor to Parke, Davis & Company, Detroit, Mich., a corporation of Michigan No Drawing. Application November 23, 1948, Serial No. 61,741

6 Claims. (Cl. 260—239.6)

This application is a continuation-in-part of my copending application Serial No. 481,007, filed March 29, 1943, now Patent No. 2,454,835, issued November 30, 1948, and the invention relates to substituted diamino diphenyl sulfones and to processes for obtaining the same. More particularly, the invention relates to substituted diamino diphenyl sulfones characterized by one free amino group and an amino group bearing a basically substituted alkyl radical. These products have the general formula,

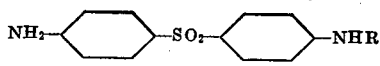

where R represents an alkyl radical substituted on a carbon atom thereof by a basic nitrogen group such as an amino, alkylamino, alkenylamino, dialkylamino, dialkenylamino, piperidino, morpholine, pyrrolidino and thiomorpholino groups.

The free base compounds of the above general formula form acid addition salts with both inorganic and organic acids. Some examples of the salts which may be prepared by the methods hereinafter described are the hydrochloride, hydrobromide, sulfate, phosphate, oxalate, benzoate, acetate, sulfamate, hydroiodide, propionate, citrate and tartrate salts. Both the free base compounds and their acid addition salts are valuable therapeutic agents and intermediates for therapeutic agents. They are generally effective against diseases and infections caused by microorganisms such as streptococci, staphylococci, pneumococci and *Mycobacterium tuberculosis*. Many of them are effective as antiseptics upon oral administration. They are of low toxicity and are very stable chemically.

In accordance with the invention the new products are prepared by reacting p,p'-diaminodiphenyl sulfone with an alkyl halide the alkyl group of which contains a basic nitrogen substituent. This transformation can be diagrammatically illustrated as follows:

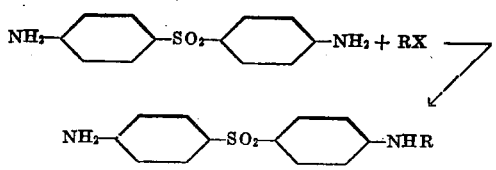

where R has the same significance as given above and X is a halogen atom.

The p-amino-p'-aminoalkylamino diphenyl sulfones can also be prepared by first reacting an alkyl halide substituted in the alkyl group by a phthalimido or similar radical with p,p'-diaminodiphenyl sulfone and hydrolyzing the product so obtained to remove the protecting group from amino group. This modification is illustrated in Example 1 below.

The invention is illustrated by the following examples.

*Example 1.—p-Amino-p'-(γ-aminopropylamino) diphenyl sulfone*

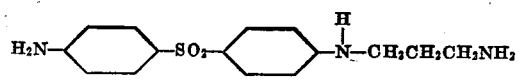

95 grams of 4,4'-diamino diphenyl sulfone, 109 grams of 2-bromopropyl phthalimide, 600 cc. of alcohol and 750 cc. of water are mixed and refluxed for 30 hours. The mixture is cooled and the crystals which form are filtered off. 40 grams of these crystals are insoluble in alcohol. This alcohol insoluble material is mixed with 200 cc. of alcohol and 11 grams of hydrazine hydrate. The mixture is refluxed for a short time. The entire reaction mixture forms a white solid. Heating on the steam bath is continued for an hour and then most of the alcohol removed by vacuum distillation. The residue is refluxed with 500 cc. of 2% HCl solution for an hour. It is then filtered and the filtrate charcoaled. Upon evaporation, the product separates as an oil. A large excess of absolute alcoholic HCl is added and a white solid is obtained. Dry ether is added, the product worked well and then filtered. The residue on the filter is washed with dry ether and dried. It is a trihydrochloride melting at 180 to 190° C. with evolution of gas. Analyses show it to be the tri-hydrochloride of the base with the above given formula. The hydrochloride can be neutralized to obtain the amine free base.

*Example 2.—p-Amino-p'-(γ-diethylaminopropylamino) diphenyl sulfone*

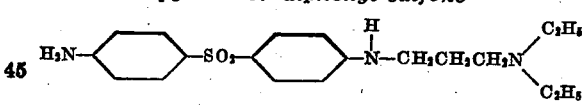

A mixture consisting of 24 g. of p,p'-diamino diphenyl sulfone, 15.5 g. of γ-diethylaminopropyl chloride and sufficient alcohol to dissolve the reactants is heated under reflux for about twelve hours. The alcohol is removed from the reaction mixture by distillation and the residue treated with 500 cc. of water. The solution is made alkaline with 10 N sodium hydroxide solution, the insoluble crude p-amino-p'-(γ-diethylaminopropylamino) diphenyl sulfone collected and purified by recrystallization from ethanol.

*Example 3.—p-Amino-p'-(β-piperidinoethylamino) diphenyl sulfone*

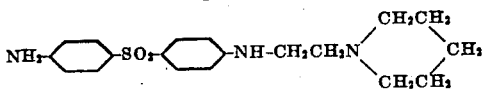

An alcoholic solution containing 24.6 g. of p,p'-diamino diphenyl sulfone and 20 g. of β-piperidinoethyl bromide is heated under reflux for twelve hours. The mixture is cooled, treated with 5% sodium hydroxide, diluted with water and the insoluble product collected. The crude p-amino-p'-(β-piperidino-ethylamino) diphenyl sulfone thus obtained is purified by recrystallization from alcohol or alcohol-water mixture.

If desired, the hydrobromide or hydrochloride salt of this product can be prepared by adding dry hydrogen bromide or hydrogen chloride to an alcoholic solution of the free base.

*Example 4. — p - Amino-p'-(δ-morpholinobutylamino) diphenyl sulfone*

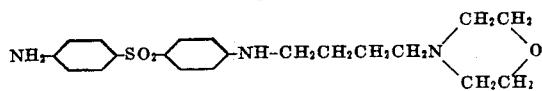

An isopropanol solution containing 24.6 g. of p,p'-diamino diphenyl sulfone and 21.8 g. of δ-morpholinobutyl bromide is refluxed for twelve hours. Most of the isopropanol is removed by distillation in vacuo, the residue cooled and treated with an excess of 10 N sodium hydroxide. The mixture is diluted with water, the insoluble product collected and purified by recrystallization from alcohol.

*Example 5. — p-Amino-p'-(γ-ethylaminopropylamino) diphenyl sulfone*

A mixture consisting of 24.6 g. of p,p'-diamino diphenyl sulfone and 20 g. of γ-ethylaminopropyl chloride hydrochloride dissolved in isopropanol is heated under reflux for twelve hours. Most of the isopropanol is removed by distillation in vacuo and the cool residue treated with 500 cc. of water. The resultant mixture is filtered, made strongly alkaline with 10 N sodium hydroxide and the insoluble material collected and purified by recrystallization from alcohol. The product so obtained is p-amino-p'(γ-ethylamino-propylamino) diphenyl sulfone.

Some further examples of the products which can be produced by use of the above described procedures are:

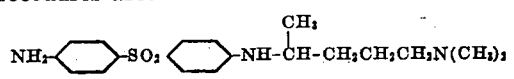

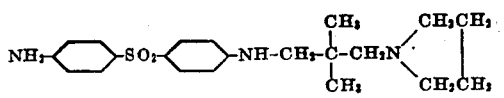

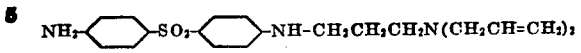

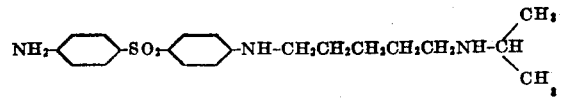

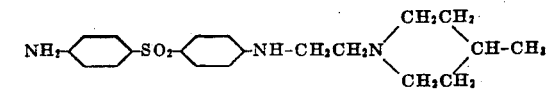

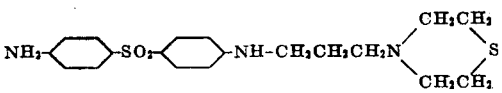

What I claim is:

1. A compound of the class consisting of a free base and its acid addition salts, said free base having the formula,

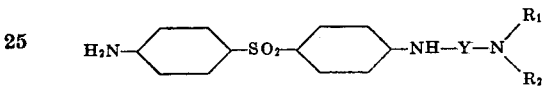

where Y is an alkylene radical containing two to five carbon atoms and $R_1$ and $R_2$ are members of the class consisting of hydrogen, lower alkyl, lower alkenyl radicals, and further members wherein $R_1$ and $R_2$ taken together with $-N=$ form piperidino, morpholino, pyrrolidino and thiomorpholino groups.

2. A compound of the formula,

3. A compound of the formula,

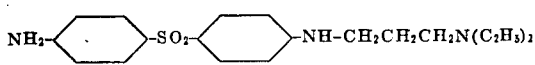

4. A compound of the formula,

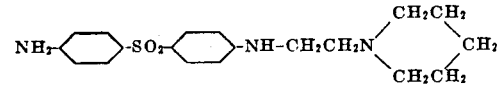

5. A compound of the formula,

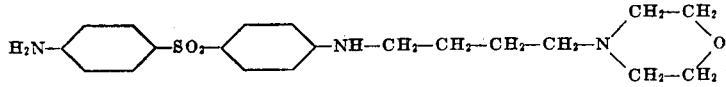

6. A compound of the formula,

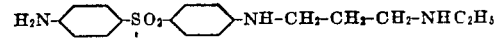

ALBERT L. RAWLINS.

REFERENCES CITED

The following references are of record in the file of this patent:

UNITED STATES PATENTS

| Number | Name | Date |
|---|---|---|
| 2,300,677 | Kharasch et al. | Nov. 3, 1942 |